United States Patent
DeWald et al.

(10) Patent No.: US 6,322,157 B1
(45) Date of Patent: Nov. 27, 2001

(54) WHEEL END FOR DRIVE AXLE

(75) Inventors: Greg DeWald, Mooresville; Tony Dalton, Statesville; Kevin Hall, Charlotte, all of NC (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/589,878

(22) Filed: Jun. 9, 2000

(51) Int. Cl.$^7$ .......................... B60B 23/00; B60B 27/00; B60B 35/16; F16C 33/76
(52) U.S. Cl. ................. 301/111; 301/105.1; 301/137; 301/124.1; 384/477
(58) Field of Search ........................... 301/1, 105.1, 109, 301/111 I, 112, 114, 116, 117, 122, 124.1, 126, 131, 132, 137; 384/477, 481, 488

(56) References Cited

U.S. PATENT DOCUMENTS

| | | | |
|---|---|---|---|
| 1,999,710 | * | 4/1935 | Weckstein .......................... 384/481 |
| 2,052,524 | * | 8/1936 | Baker .................................... 301/1 |
| 2,477,576 | | 8/1949 | Buckendale . |
| 2,858,163 | * | 10/1958 | Nagel .................................. 301/1 |
| 3,015,238 | | 1/1962 | Williams . |
| 4,234,120 | | 11/1980 | Pringle . |
| 4,417,462 | * | 11/1983 | Palovcik ............................ 301/131 |
| 5,442,977 | | 8/1995 | Danjou et al. . |
| 5,549,395 | * | 8/1996 | Sink .................................... 384/477 |
| 5,997,103 | * | 12/1999 | Wagner ............................ 301/105.1 |
| 6,017,097 | * | 1/2000 | Weir, III ........................... 301/105.1 |
| 6,126,321 | * | 10/2000 | Fetty et al. ......................... 384/477 |

FOREIGN PATENT DOCUMENTS

| | | | | |
|---|---|---|---|---|
| 3424730 A1 | * | 10/1985 | (DE) | ................................. 301/137 |
| WO 89/09141 | * | 10/1989 | (WO) | ................................ 301/137 |

* cited by examiner

*Primary Examiner*—S. Joseph Morano
*Assistant Examiner*—Jason R. Bellinger
(74) *Attorney, Agent, or Firm*—Liniak, Berenato, Longacre & White

(57) ABSTRACT

A wheel end is provided where the spindle is an integral cast and machined trumpet-shaped arm made from high strength ductile iron, and a seal retainer is provided to locate and protect the inner wheel bearing and wheel end from debris. The trumpet-shaped arm is formed with a long parabolic radius machined with a reasonable surface finish to reduce or significantly eliminate stress concentrations. The mating cast iron seal retainer is employed to provide proper location for the inner wheel bearing and to transfer axial loads of the bearing to the spindle shoulder. In addition, the seal retainer retains the inner half of the seal face and provides a sealing surface to prevent escape of the axle wheel end oil. In this design, the outside diameter of the seal retainer is made to fit inside the wheel hub bore where it is protected from rocks, stumps, other debris, etc. The shape of the back exterior of the retainer is made in such a way that vines, wires, rope, etc that become entangled in the wheel(s) are passed onto the trumpet arm where they will do no damage.

7 Claims, 2 Drawing Sheets

WHEEL END FOR DRIVE AXLE

FIELD OF THE INVENTION

The present invention relates to axle housings, and particularly to an integrally cast spindle having a machined trumpet arm made from high strength ductile iron and a corresponding seal retainer that prevent debris from damaging the wheel end.

DESCRIPTION OF RELATED ART

In the past, it has been the practice on heavy trucks to make an axle housing from seamless tubing which had one end hot-forged to form a spindle and the opposite end expanded to form one-half of a banjo housing provided at the center of the axle housing. Typically, the material of the spindle is high strength steel or ductile iron, and this material is very sensitive to stress concentration and fatigue-related issues. Therefore, serious drawbacks result when the spindle is formed with ridges, shoulders and large-diameter portions.

FIG. 1 shows one type of prior art wheel end assembly, wherein a pair of bearings 12, 14 are mounted onto the spindle 10. The spindle 10 is formed with an inside shoulder 10a, and an outside mounting abutment 11 is bolted onto the spindle 10 via bolts 15. The inside bearing 12 abuts the inside surface of the large diameter shoulder 10a, and the outside bearing 14 abuts the mounting abutment 11. A seal member 18 is mounted onto the large diameter shoulder 10a to provide a sealing interface between the spindle 10 and the wheel hub 1.

FIG. 2 shows another type of prior art wheel end assembly, wherein a pair of bearings 22 are mounted onto the spindle 20. The spindle 20 is formed with an inside shoulder 20a, and an outside mounting abutment (not shown) is provided. The inside bearing 22 abuts the inside surface of the large diameter shoulder 20a. A seal member 28 is mounted onto the large diameter shoulder 20a and against a second mounting shoulder 22b to provide a sealing interface between the spindle 20 and the wheel hub 21.

Such conventional wheel end designs use either very large expensive wheel bearings and extra large diameters of the spindle to make up for the high stress concentration factor in conventional designs. Moreover, because of the high stress concentrations and large bearings used for the spindle, it is also known to bolt a steel spindle onto a ductile iron housing. However, this arrangement is very expensive and inefficient to manufacture.

The need exists for a drive axle wheel end wherein the stress concentration factors are diminished or significantly eliminated.

SUMMARY OF THE INVENTION

The present invention overcomes the drawbacks and deficiencies that exist in the prior art wheel end for drive axles.

The present invention maximizes the strength and capacity of the spindle structure by implementing a stress-concentration-free design. The present invention also eliminates the required bolted joint and two-piece structure of the conventional axle design, thus substantially reducing cost.

In the preferred design, the spindle of the instant invention is an integral cast and machined trumpet-shaped arm made from high strength ductile iron, wherein a seal retainer is provided to locate and protect the inner wheel bearing and wheel end from debris. The trumpet-shaped arm is formed with a long parabolic radius machined with a reasonable surface finish to reduce of significantly eliminate stress concentrations.

In the preferred embodiment, a mating cast iron seal retainer is employed to provide proper location for the inner wheel bearing and to transfer axial loads of the bearing to the spindle shoulder. In addition, the seal retainer retains the inner half of the seal face and provides a sealing surface to prevent escape of the axle wheel end oil. In this design, the outside diameter of the seal retainer is made to fit inside the wheel hub bore where it is protected from rocks, stumps, other debris, etc. The shape of the back exterior of the retainer is made in such a way that vines, wires, rope, etc that become entangled in the wheel(s) is not caught by the retainer; instead, spindle and seal design passes the debris onto the trumpet arm where the debris will do no damage.

Moreover, the planet carrier to wheel hub pilot diameter is moved to the outside diameter of the two parts. This arrangement allows the planet carrier casting to be a simple green sand casting with no cores.

DETAILED DESCRIPTION OF PREFERRED EMBODIMENT

Figure 1:
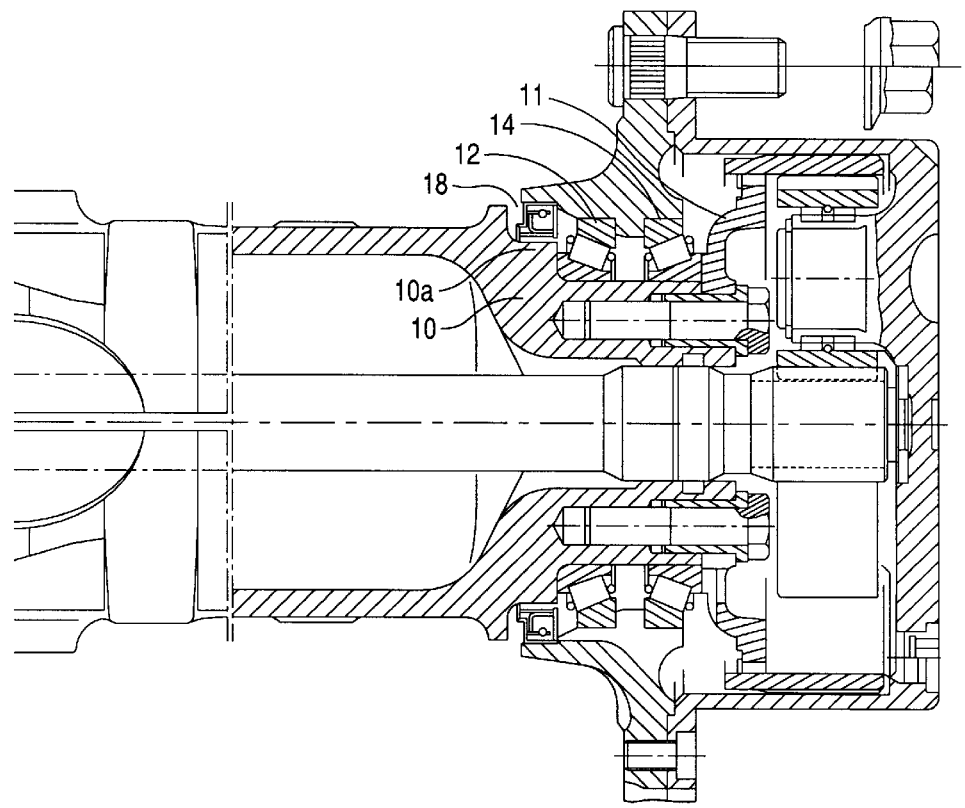
FIGS. 1 and 2 are prior art wheel end assemblies.
Figure 2:
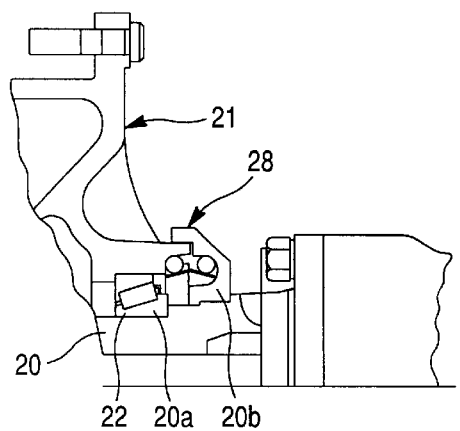
Figure 3:
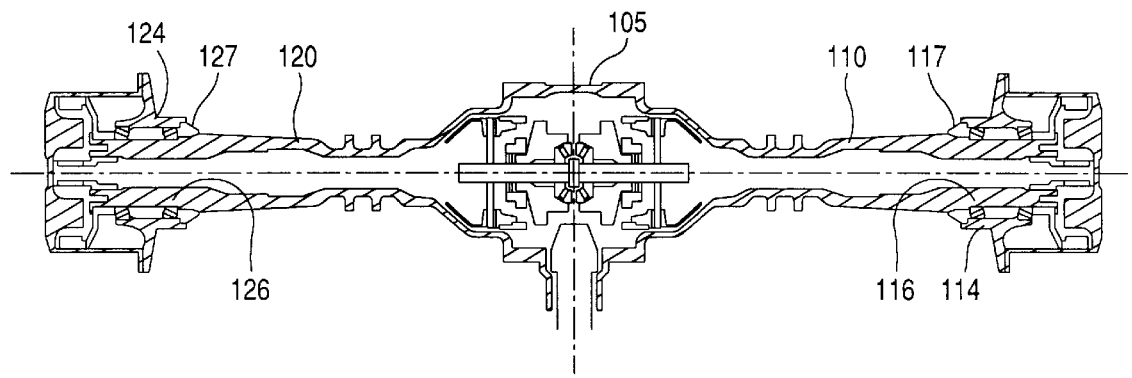
FIG. 3 is a cross sectional view of a entire axle tube with a differential disposed at the midpoint of the axle tube.
Figure 4:
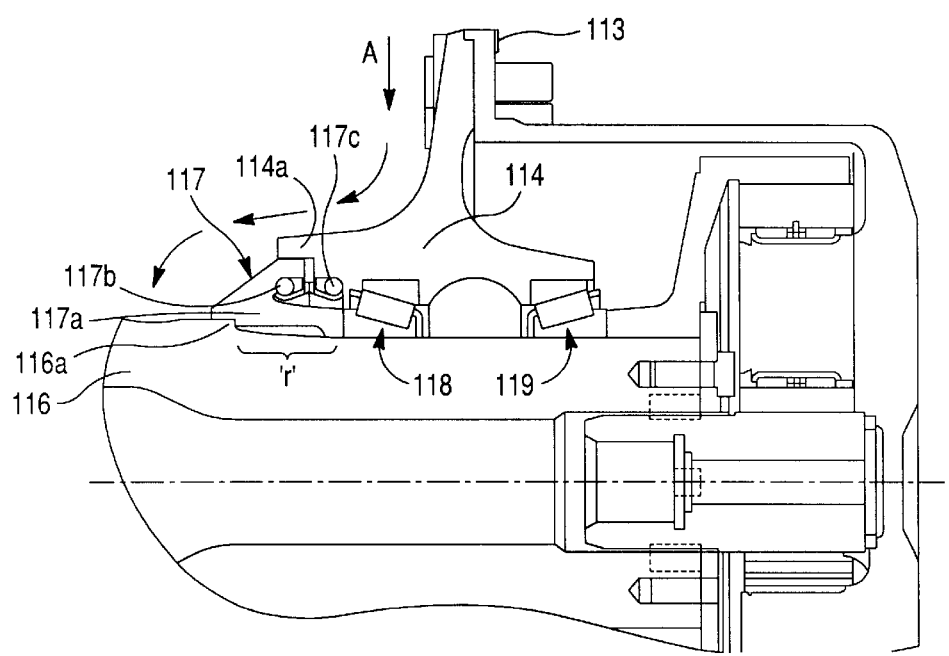
FIG. 4 is a partial cross section of one end of the axle tube shown in FIG. 3 and showing the trumpet-shaped pinion, bearings and seal arrangement setting forth the preferred embodiment of this invention.

With reference to FIGS. 3 and 4, the present invention sets forth a unique wheel end assembly, wherein the axle housing consists of a pair of axle tubes 110, 120 extending from a central differential housing 105. Each wheel end comprises a wheel hub 114, 124 mounted on the axle tube spindle 116, 126, and a seal 117, 127 disposed at an interface between the axle tube 110, 120 and the wheel hub 114, 124, respectively.

The wheel end assembly is shown in detail in FIG. 4, wherein the axle tube spindle 116 is formed with a long, parabolic-shaped radius in the region labeled 'r' in FIG. 4. Mounted on the axle tube spindle 116 are a pair of bearings 118, 119 rotatable supporting the hub 114. A mating cast iron seal retainer 117a is employed to provide proper location for the inner wheel bearing 118 and to transfer axial loads of the bearing to the spindle shoulder 116a. In addition, the seal retainer 117a retains the inner half of the seal face for the seals 117b, 117c and provides a sealing surface to prevent escape of the axle wheel end oil (not shown). In this design, the outside diameter of the seal retainer 117a is made to fit inside the wheel hub bore 114a where it is protected from rocks, stumps, other debris, etc. The shape of the back exterior of the retainer is made in such a way that any debris that becomes entangled in the wheel(s) is not caught by the retainer; instead, the debris is passed along the direction indicated by arrows 'A' shown in FIG. 4 onto the trumpet arm and axle tube 116 where it will do no damage.

Moreover, the planet carrier 113 to wheel hub pilot diameter is moved to the outside diameter of the two parts. This arrangement allows the planet carrier casting to be a simple green sand casting with no cores.

As evident from the drawings and associated description, the present invention maximizes the strength and capacity of the spindle structure by implementing a stressconcentration-free design. The present invention also eliminates the required bolted joint and two-piece structure of the conventional axle design, thus substantially reducing cost.

In the preferred design, the spindle of the instant invention is an integral cast and machined trumpet-shaped arm (see region 'r') made from high strength ductile iron, wherein the seal retainer 117*a* is provided to locate and protect the inner wheel bearing and wheel end from debris. The trumpet-shaped arm in the region of the seal assembly is formed with a long parabolic radius machined with a reasonable surface finish to reduce of significantly eliminate stress concentrations.

While the foregoing invention has been shown and described with reference to a preferred embodiment, it will be understood by those of skill in the art that various changes in form and detail may be made therein without departing from the spirit and scope of the invention.

What is claimed is:

1. A wheel end assembly, comprising:
   an axle tube defining a spindle extending along a longitudinal axis;
   at least one bearing member mounted onto said spindle;
   a hub assembly rotatably mounted about said spindle by said at least one bearing member; and
   a seal assembly disposed adjacent said bearing member and at an interface between said spindle and said hub assembly,
   wherein said spindle is formed with an external diameter defining an elongated parabolic shape along said longitudinal axis radially inside said seal assembly.

2. The wheel end assembly of claim 1, wherein said external diameter gradually increases along said longitudinal direction away from said hub assembly.

3. The wheel end assembly of claim 1, wherein said seal assembly comprises a seal retainer spanning a distance from said spindle to said hub assembly, said seal retainer retaining at least one seal member thereupon.

4. The wheel end assembly of claim 3, wherein said seal retainer abuts a shoulder formed on said spindle and an inner race of said at least one bearing member.

5. The wheel end assembly of claim 3, wherein said seal retainer is received radially within a bore portion formed on said hub assembly.

6. The wheel end assembly of claim 3, wherein said seal retainer defines a gradually sloping surface extending from said hub assembly to said spindle to divert debris away from said at least one bearing member.

7. The wheel end assembly of claim 3, wherein said seal retainer locates said at least one bearing member along said spindle and effectively transfers an axial load from said bearing member to a spindle shoulder.

\* \* \* \* \*